(12) United States Patent    (10) Patent No.: US 9,792,074 B2
Stenfort et al.    (45) Date of Patent: Oct. 17, 2017

(54) SYSTEM, METHOD, AND COMPUTER PROGRAM PRODUCT FOR INTERFACING ONE OR MORE STORAGE DEVICES WITH A PLURALITY OF BRIDGE CHIPS

(75) Inventors: Ross John Stenfort, Los Altos, CA (US); Radoslav Danilak, Cupertino, CA (US)

(73) Assignee: Seagate Technology LLC, Cupertino, CA (US)

( * ) Notice: Subject to any disclaimer, the term of this patent is extended or adjusted under 35 U.S.C. 154(b) by 421 days.

(21) Appl. No.: 12/498,162

(22) Filed: Jul. 6, 2009

(65) Prior Publication Data

US 2011/0004710 A1    Jan. 6, 2011

(51) Int. Cl.
*G06F 3/00*    (2006.01)
*G06F 3/06*    (2006.01)

(52) U.S. Cl.
CPC ............ *G06F 3/0661* (2013.01); *G06F 3/061* (2013.01); *G06F 3/0674* (2013.01)

(58) Field of Classification Search
CPC ....... G06F 3/061; G06F 3/0661; G06F 3/0674
USPC .......................................................... 710/51
See application file for complete search history.

(56) References Cited

U.S. PATENT DOCUMENTS

| | | |
|---|---|---|
| 5,386,552 A | 1/1995 | Garney |
| 5,485,595 A | 1/1996 | Assar et al. .................. 395/430 |
| 5,519,831 A | 5/1996 | Holzhammer |
| 5,544,356 A | 8/1996 | Robinson et al. ............ 395/600 |
| 5,568,423 A | 10/1996 | Jou et al. ................. 365/185.33 |
| 5,568,626 A | 10/1996 | Takizawa ...................... 395/430 |
| 5,621,687 A | 4/1997 | Doller ....................... 365/185.29 |
| 5,675,816 A | 10/1997 | Hiyoshi et al. |
| 5,819,307 A | 10/1998 | Iwamoto et al. ............. 711/103 |
| 5,835,935 A | 11/1998 | Estakhri et al. ............. 711/103 |
| 5,881,229 A | 3/1999 | Singh et al. ............ 395/200.33 |
| 5,937,434 A | 8/1999 | Hasbun et al. |
| 5,956,473 A | 9/1999 | Ma et al. ................. 395/182.03 |
| 5,963,970 A | 10/1999 | Davis ............................ 711/103 |
| 6,000,006 A | 12/1999 | Bruce et al. .................. 711/103 |
| 6,154,808 A | 11/2000 | Nagase et al. ................ 711/103 |
| 6,173,360 B1 | 1/2001 | Beardsley et al. |
| 6,230,233 B1 | 5/2001 | Lofgren et al. ............... 711/103 |
| 6,405,295 B1 | 6/2002 | Bando .......................... 711/165 |
| 6,446,183 B1 | 9/2002 | Challenger et al. |

(Continued)

FOREIGN PATENT DOCUMENTS

| | | |
|---|---|---|
| WO | WO2010111694 A2 | 9/2010 |
| WO | WO2010111694 A3 | 9/2010 |

(Continued)

OTHER PUBLICATIONS

Oct. 3, 2011 List of Art Rejections, 1 page.

(Continued)

*Primary Examiner* — Idriss N Alrobaye
*Assistant Examiner* — Brooke Taylor
(74) *Attorney, Agent, or Firm* — Taylor English Duma LLP

(57) ABSTRACT

A system, method, and computer program product are provided for interfacing one or more storage devices with a plurality of bridge chips. One or more storage devices are provided. Additionally, a plurality of bridge chips are provided. Furthermore, at least one multiplexing device is provided for interfacing the one or more storage devices with the plurality of bridge chips.

19 Claims, 7 Drawing Sheets

(56) References Cited

U.S. PATENT DOCUMENTS

| | | | |
|---|---|---|---|
| 6,539,453 B1 | 3/2003 | Guterman | 711/103 |
| 6,694,402 B1 | 2/2004 | Muller | 711/103 |
| 6,732,221 B2 | 5/2004 | Ban | 711/103 |
| 6,831,865 B2 | 12/2004 | Chang et al. | 365/185.33 |
| 6,914,853 B2 | 7/2005 | Coulson | 365/236 |
| 6,925,523 B2 | 8/2005 | Engel et al. | 711/103 |
| 6,948,026 B2 | 9/2005 | Keays | 711/103 |
| 6,973,531 B1 | 12/2005 | Chang et al. | 711/103 |
| 6,985,992 B1 | 1/2006 | Chang et al. | 711/103 |
| 7,000,063 B2 | 2/2006 | Friedman et al. | 711/103 |
| 7,032,087 B1 | 4/2006 | Chang et al. | 711/156 |
| 7,035,967 B2 | 4/2006 | Chang et al. | 711/103 |
| 7,076,605 B1 | 7/2006 | Son | |
| 7,096,313 B1 | 8/2006 | Chang et al. | 711/103 |
| 7,103,732 B1 | 9/2006 | Chang et al. | 711/156 |
| 7,120,729 B2 | 10/2006 | Gonzalez et al. | 711/103 |
| 7,395,384 B2 | 7/2008 | Sinclair et al. | |
| 7,552,306 B2 | 6/2009 | Madhavarao et al. | |
| 7,681,008 B2 | 3/2010 | Tomlin et al. | |
| 7,689,762 B2 | 3/2010 | Hobson | |
| 2004/0081179 A1* | 4/2004 | Gregorcyk, Jr. | G06F 11/2007 370/402 |
| 2005/0102323 A1 | 5/2005 | Henderson et al. | |
| 2006/0004935 A1 | 1/2006 | Seto et al. | |
| 2006/0020744 A1 | 1/2006 | Sinclair et al. | |
| 2006/0020745 A1 | 1/2006 | Conley et al. | |
| 2006/0265549 A1 | 11/2006 | Chapel et al. | |
| 2007/0005815 A1 | 1/2007 | Boyd et al. | |
| 2007/0030734 A1 | 2/2007 | Sinclair et al. | |
| 2007/0136521 A1* | 6/2007 | Voorhees et al. | 711/112 |
| 2007/0234117 A1 | 10/2007 | Elliott et al. | |
| 2008/0082741 A1 | 4/2008 | Biessener et al. | |
| 2008/0082773 A1 | 4/2008 | Tomlin et al. | |
| 2008/0082774 A1 | 4/2008 | Tomlin et al. | |
| 2008/0091898 A1 | 4/2008 | Takahashi et al. | |
| 2008/0151405 A1 | 6/2008 | Kurtas et al. | |
| 2008/0155145 A1 | 6/2008 | Stenfort | |
| 2008/0155163 A1 | 6/2008 | Stenfort | |
| 2008/0155562 A1 | 6/2008 | Stenfort | |
| 2008/0162811 A1* | 7/2008 | Steinmetz | G06F 13/4234 711/114 |
| 2008/0215926 A1 | 9/2008 | Stenfort | |
| 2008/0229045 A1 | 9/2008 | Qi | |
| 2008/0276035 A1 | 11/2008 | Hobson | |
| 2008/0307155 A1 | 12/2008 | Sinclair | |
| 2009/0006787 A1 | 1/2009 | De Souza et al. | |
| 2009/0077315 A1 | 3/2009 | Ogasawara | |
| 2009/0164698 A1 | 6/2009 | Ji et al. | |
| 2009/0259882 A1* | 10/2009 | Shellhamer | 714/7 |
| 2009/0313411 A1 | 12/2009 | Stenfort | |
| 2009/0313443 A1 | 12/2009 | Stenfort | |
| 2009/0313527 A1 | 12/2009 | Stenfort | |
| 2010/0058021 A1 | 3/2010 | Kawamura | |
| 2010/0250829 A1 | 9/2010 | Stenfort | |
| 2010/0250830 A1 | 9/2010 | Stenfort | |
| 2011/0004722 A1 | 1/2011 | Jeddeloh | |

FOREIGN PATENT DOCUMENTS

| | | |
|---|---|---|
| WO | WO2011003050 A2 | 1/2011 |
| WO | WO2011003050 A3 | 1/2011 |

OTHER PUBLICATIONS

"The Encyclopedia of Networking", Werner Feibel, Network Press, 2nd Edition, 1995; 3 sheets (Title, copyright and p. 873).

"Illustrated Dictionary of Computing", Jonar C Nader, Prentice Hall, 2nd Edition,1995; 3 sheets (including inter alia Title, copyright pages and pp. 510-511).

"max out", In Merriam-Webster Online Dictionary, as captured by the Internet Archive on Apr. 24, 2009, as retrieved Jun. 14, 2014 from the Internet Archive at web.archive.org/web/20090422104955/http://www.merriamwebster.com/dictionary/max out, 1 sheet.

* cited by examiner

SYSTEM, METHOD, AND COMPUTER PROGRAM PRODUCT FOR INTERFACING ONE OR MORE STORAGE DEVICES WITH A PLURALITY OF BRIDGE CHIPS

FIELD OF THE INVENTION

The present invention relates to storage systems, and more particularly to storage systems including bridge device topologies.

BACKGROUND

Often, memory systems use a bridge chip topology for translating commands associated with one protocol to another protocol associated with a drive being utilized. Typical bridge device topologies include a bridge coupled to a drive. In these cases, the single bridge typically supports multiple output devices on multiple ports.

If the drive is much faster than the bridge, then the performance of the drive is limited by the bridge and a single drive unit will not see the performance of the drive. Rather, the unit will see the performance of the bridge. There is thus a need for addressing these and/or other issues associated with the prior art.

SUMMARY

A system, method, and computer program product are provided for interfacing one or more storage devices with a plurality of bridge chips. One or more storage devices are provided. Additionally, a plurality of bridge chips are provided. Furthermore, at least one multiplexing device is provided for interfacing the one or more storage devices with the plurality of bridge chips.

DETAILED DESCRIPTION

Figure 1:
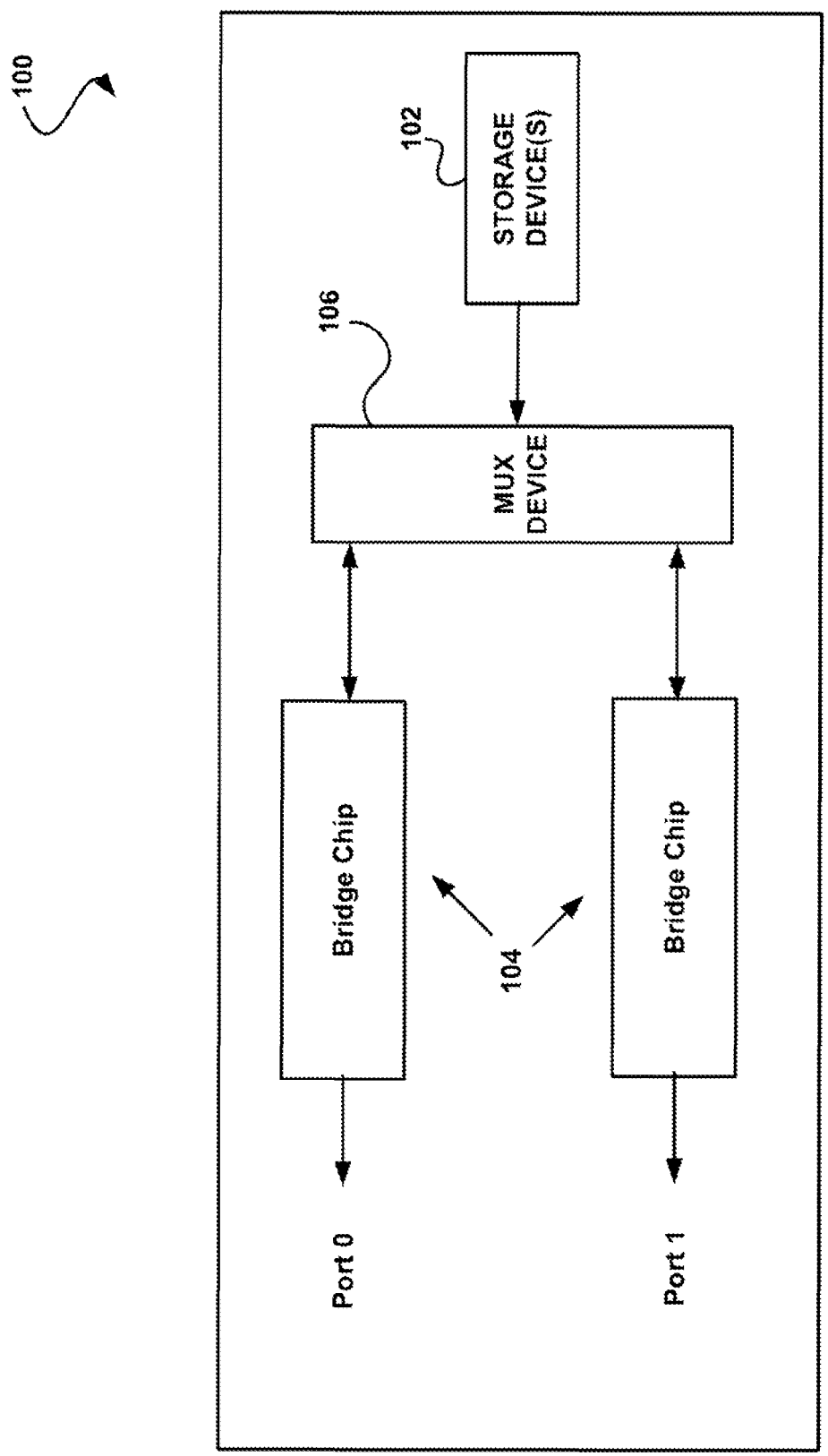
FIG. 1 shows a system for interfacing one or more storage devices with a plurality of bridge chips, in accordance with one embodiment.

FIG. 1 shows a system 100 for interfacing one or more storage devices with a plurality of bridge chips, in accordance with one embodiment. As shown, the system 100 includes one or more storage devices 102.

In the context of the present description, a storage device refers to any device capable of storing data. For example, in various embodiments, the storage device 102 may include, but is not limited to, a Serial ATA (SATA) drive, a Serial Attached SCSI (SAS) drive, a Fibre Channel (FC) drive, or a Universal Serial Bus (USB) drive, and/or any other storage device.

Additionally, the system 100 includes a plurality of bridge chips 104. In the context of the present description, a bridge chip refers to any device capable of performing a protocol translation. For example, in various embodiments, the bridge chips 104 may include an SAS/SATA bridge (e.g. an SAS to SATA bridge, etc.), a USB/SATA bridge (e.g. a USB to SATA bridge, etc.), an FC/SATA bridge (e.g. an FC to SATA bridge, etc.), PCI/PCIe to SAS/SATA bridge, or any device capable of performing a protocol translation.

Furthermore, at least one multiplexing device 106 is provided for interfacing the one or more storage devices 102 with the plurality of bridge chips 104. In the context of the present description, a multiplexing device refers to any device capable of performing multiplexing. For example, in various embodiments, the multiplexing device may include a multiplexer, a bridge chip, a bridge, or any other device (e.g. hardware and/or software, etc.) capable of performing multiplexing.

In various embodiments, the interfacing may include a direct connection or an indirect connection. In either case, the multiplexing device 106 may provide an interface such that the storage devices 102 may communicate with the plurality of bridge chips 104. In this way, multiple bridge chips may be utilized in a storage system. Thus, the resources associated with a bridge chip may be solely dedicated to a particular device (e.g. a port, translation function, etc.). Of course, the resources of the bridge chip may be allocated in any manner desired.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
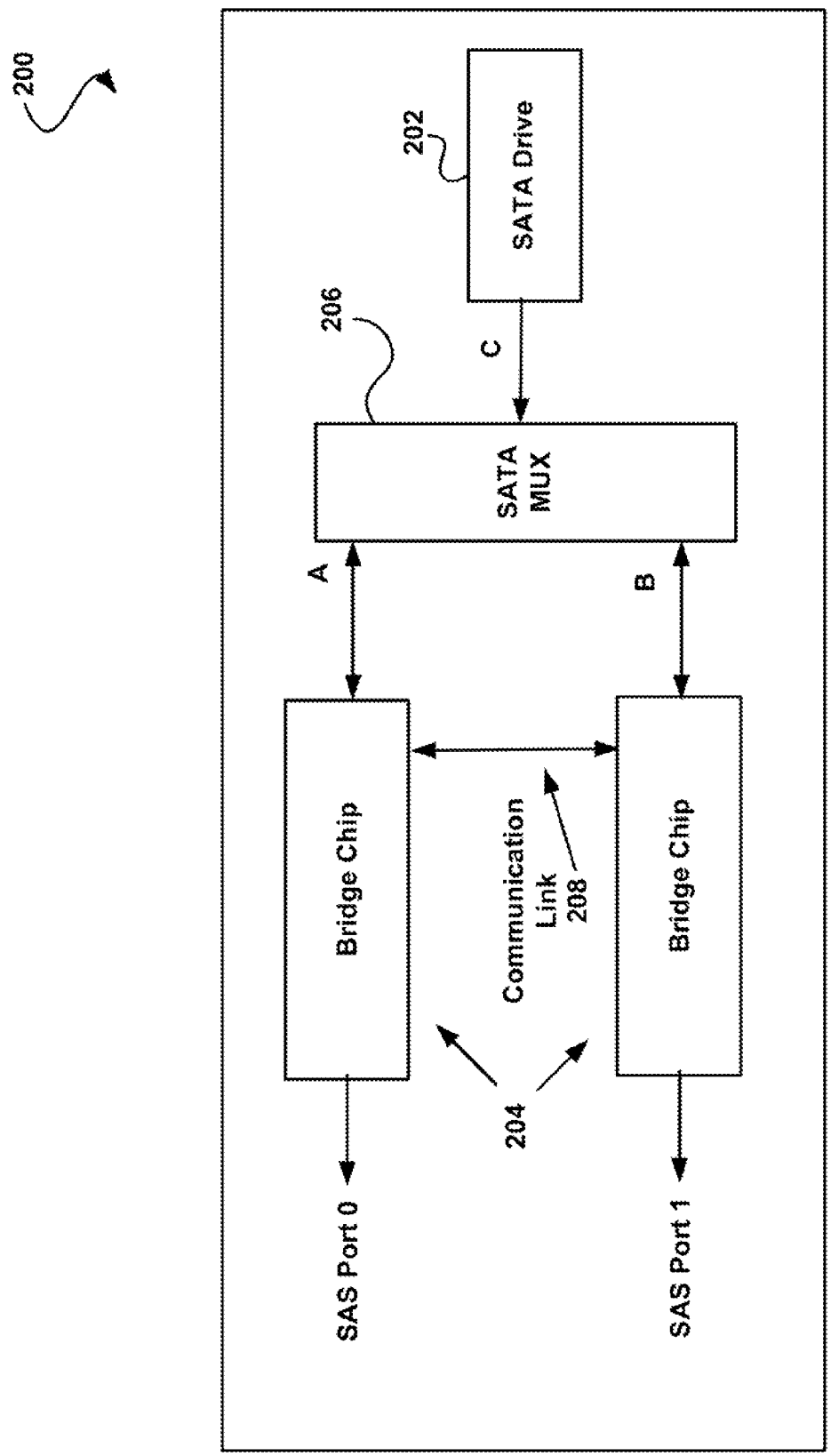
FIG. 2 shows a system for interfacing one or more storage devices with a plurality of bridge chips, in accordance with another embodiment.

FIG. 2 shows a system 200 for interfacing one or more storage devices with a plurality of bridge chips, in accordance with another embodiment. As an option, the present system 200 may be implemented in the context of the details of FIG. 1. Of course, however, the system 200 may be implemented in any desired environment. It should also be noted that the aforementioned definitions may apply during the present description.

As shown, the system 200 includes a storage device 202. In this case, the storage device 202 includes a SATA drive. Additionally, the system 200 includes a plurality of bridge chips 204.

In various embodiments, the bridge chips may include an SAS/SATA bridge (e.g. an SAS to SATA bridge, etc.), a USB/SATA bridge (e.g. a USB to SATA bridge, etc.), an FC/SATA bridge (e.g. an FC to SATA bridge, etc.), or any device capable of performing a protocol translation. In this case, the bridge chips 204 include an SAS/SATA bridge.

Furthermore, at least one multiplexer 206 is provided for interfacing the storage device 202 with the bridge chips 204. In this case, the multiplexer 206 includes a SATA multiplexer. Additionally, the multiplexer 206 may include a plurality of ports.

For example, the multiplexer 206 may include a plurality of input ports. The input ports may be connected to the storage device 202. Additionally, the multiplexer 206 may include a plurality of output ports. The output ports may be connected to the plurality of bridge chips 204. In this case, a number of the output ports may be divided equally and allocated to each of the bridge chips 204.

In one embodiment, the multiplexer 206 may be configured such that each of the plurality of ports are active at the same time. Furthermore, one of the plurality of bridge chips 204 may be connected to a group of the plurality of ports.

As shown in FIG. 2, as an option, a communication link 208 may be provided between one or more of the bridge chips 204. In one embodiment, the communication link 208 may be configured such that each of the bridge chips 204 are capable of communicating with the other bridge chips 204.

As an option, the communication link 208 may be configured to be utilized for error recovery. As another option, the communication link 208 may be configured to be utilized for vender unique communication. As shown further in FIG. 2, each of the plurality of bridge chips 204 may be dedicated to a single Serial Attached SCSI (SAS) port.

In this way, storage systems using storage devices (e.g. SATA drives, etc.) that are much faster than an attached bridge will not be limited by the bridge. This may be accomplished by using multiple bridges connected to a multiplexing device.

As shown in FIG. 2, a SATA multiplexer is utilized. All ports of the SATA multiplexer may be active at the same time. The bridge chips may then use all of their resources for a single SAS port.

As noted, there may also be a communication path between the bridge chip for error recovery and other vendor unique communication. This may greatly improve the bridge performance for a single port since all the bridge resources may be used to drive one port and not two ports. It should be noted that the performance may then be based on multiple bridge chips and not one bridge chip. This allows each bridge chip to focus resources on a particular bridge function.

In one embodiment, the SATA multiplexer may be implemented using a number of tags from a first port and a number of tags on a second port. The tags on a third port may then be dedicated to the storage device. For example, the multiplexer may be implemented using tags 0-15 from port A and 0-15 on the port B, and then queuing tags 0-31 on port C to the SATA drive.

Figure 3:
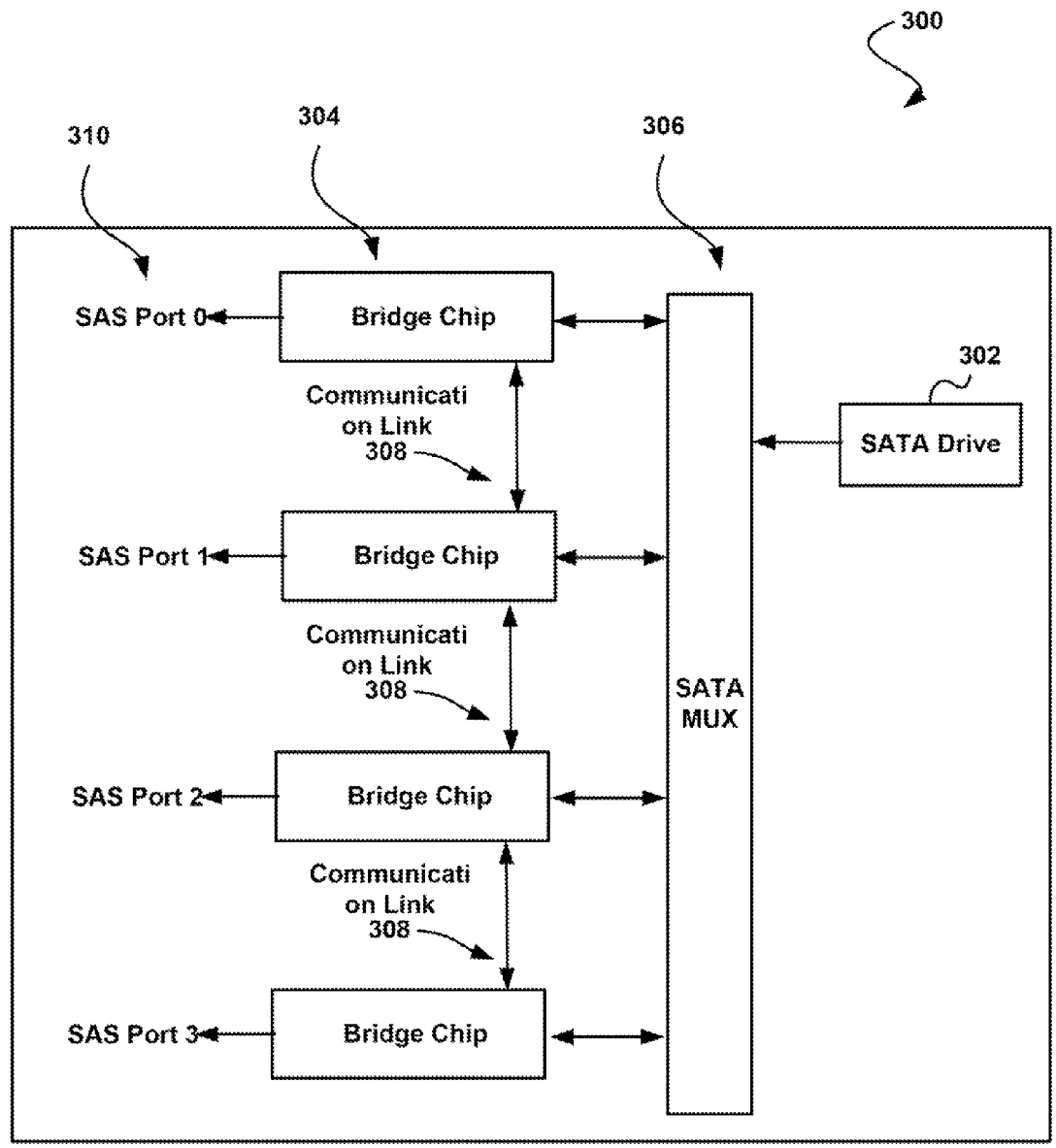
FIG. 3 shows a system for interfacing one or more storage devices with a plurality of bridge chips, in accordance with another embodiment.

FIG. 3 shows a system 300 for interfacing one or more storage devices with a plurality of bridge chips, in accordance with another embodiment. As an option, the present system 300 may be implemented in the context of the functionality and architecture of FIGS. 1-2. Of course, however, the system 300 may be implemented in any desired environment. Again, the aforementioned definitions may apply during the present description.

As shown, a SATA drive 302 is in communication with multiple bridge chips 304. In this case, a SATA multiplexer 306 interfaces the SATA drive 302 and the bridge chips 304. Further, multiple communication links 308 are provided.

The communication links 308 may include any type of communication path capable of being used to communicate between bridge chips. In various embodiments, the communication links 308 may be utilized for error recovery, vendor unique communication, and/or any other type of communication between bridge chips.

The bridge chips 304 are capable of using all of the resources for a single SAS port. As shown, each of the bridge chips 304 are dedicated to one SAS port 310. This may greatly improve the bridge performance for a single port since all the bridge resources may drive only one port.

It should be noted that any number of bridge chips may be utilized with one or more multiplexing devices. In one embodiment, the number of bridge chips used in the system may be equal to the number of SAS ports present. Of course, any number of bridge chips may be utilized.

Figure 4A:
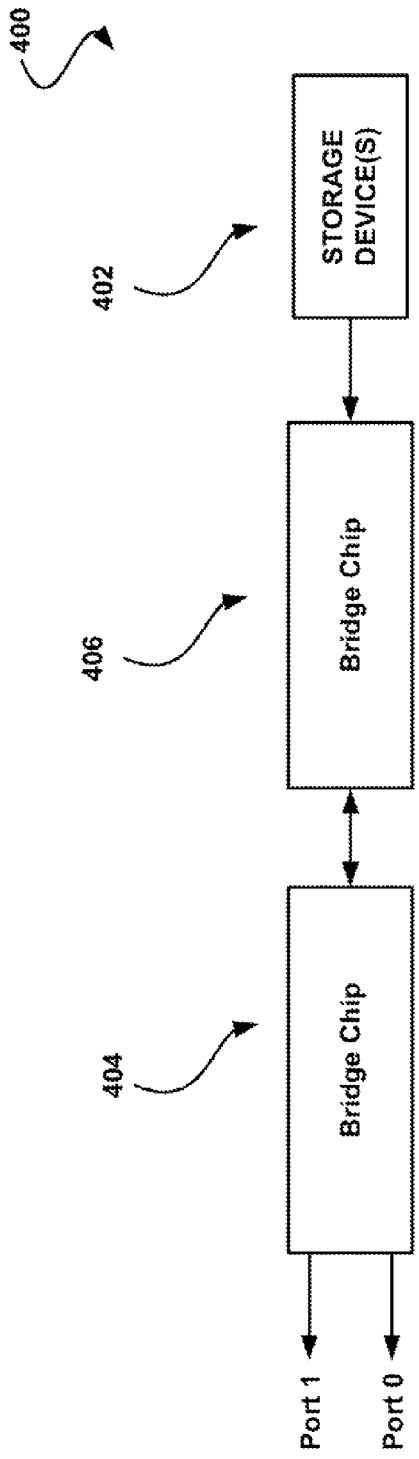
FIGS. 4A-4B show systems for interfacing one or more storage devices with a plurality of bridge chips, in accordance with another embodiment.
Figure 4B:
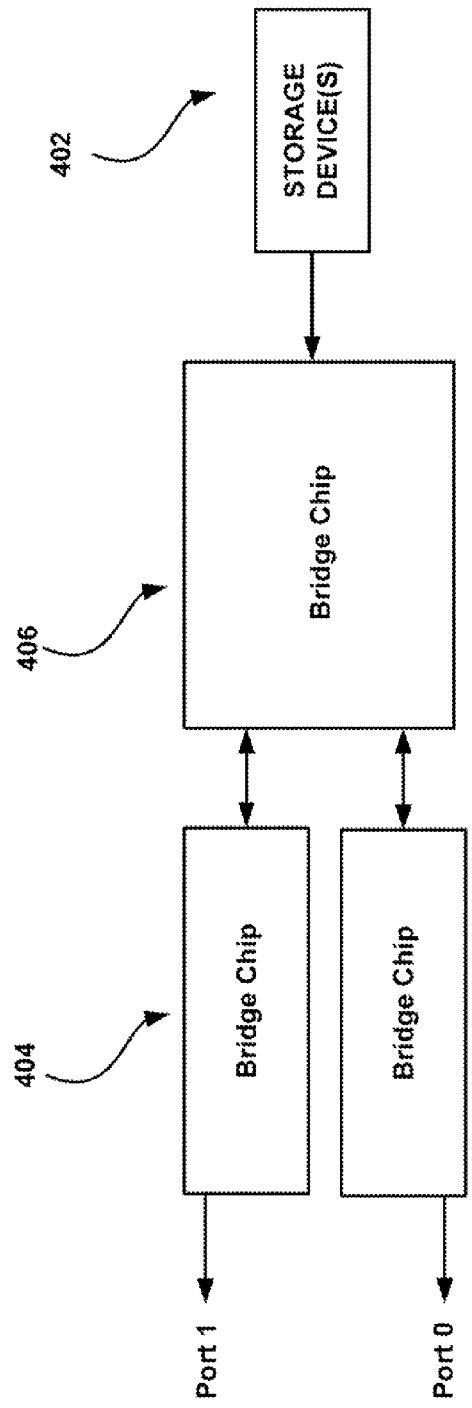

FIGS. 4A-4B show systems 400 for interfacing one or more storage devices with a plurality of bridge chips, in accordance with another embodiment. As an option, the present systems 400 may be implemented in the context of the functionality and architecture of FIGS. 1-3. Of course, however, the systems 400 may be implemented in any desired environment. The aforementioned definitions may apply during the present description.

As shown, a plurality of storage devices 402 are provided. Further, one or more bridge chips 404 dedicated to interfacing with devices coupled to the storage devices 402 (e.g. device ports, etc.) are provided. Additionally, one or more bridge chips 406 may be utilized as a multiplexing device.

Thus, if the resources are maxed out on one of the bridge chips 404, data may be distributed across the bridge chips 406, where at least one of the bridge chips 406 include multiplexer type functionality. In another embodiment, a multiplexer may be utilized, and additionally, functions may be spread across multiple bridges. Accordingly, a bridge chip may be used instead of a multiplexer, or in addition to multiplexer to perform multiplexing functionality.

Figure 5A:
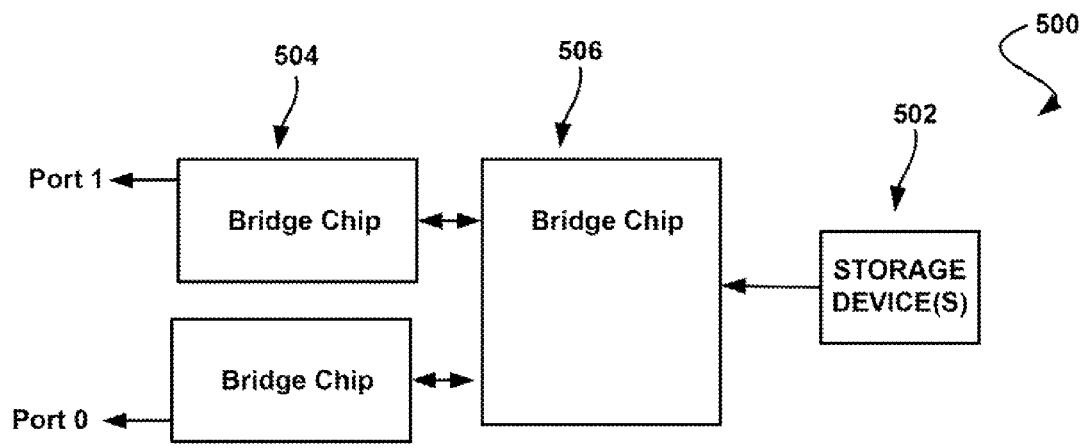
FIGS. 5A-5C show systems for interfacing one or more storage devices with a plurality of bridge chips, in accordance with various embodiments.
Figure 5B:
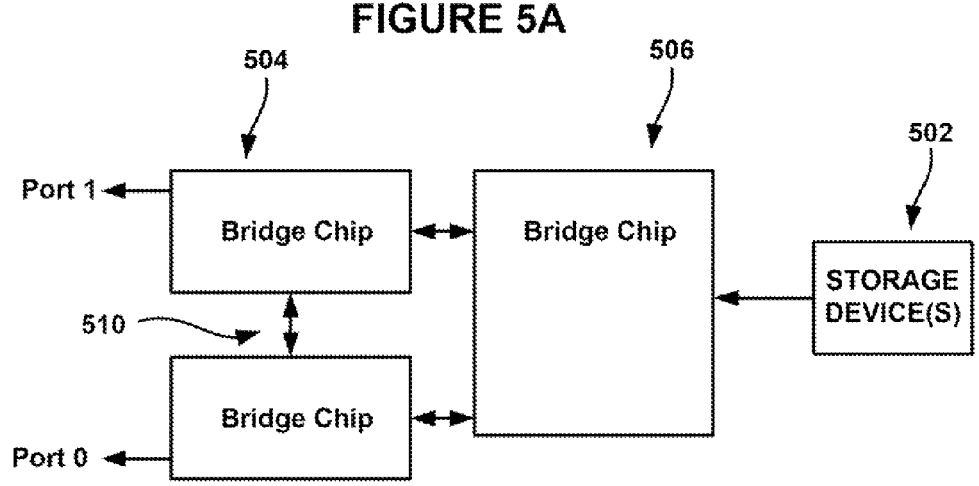
Figure 5C:
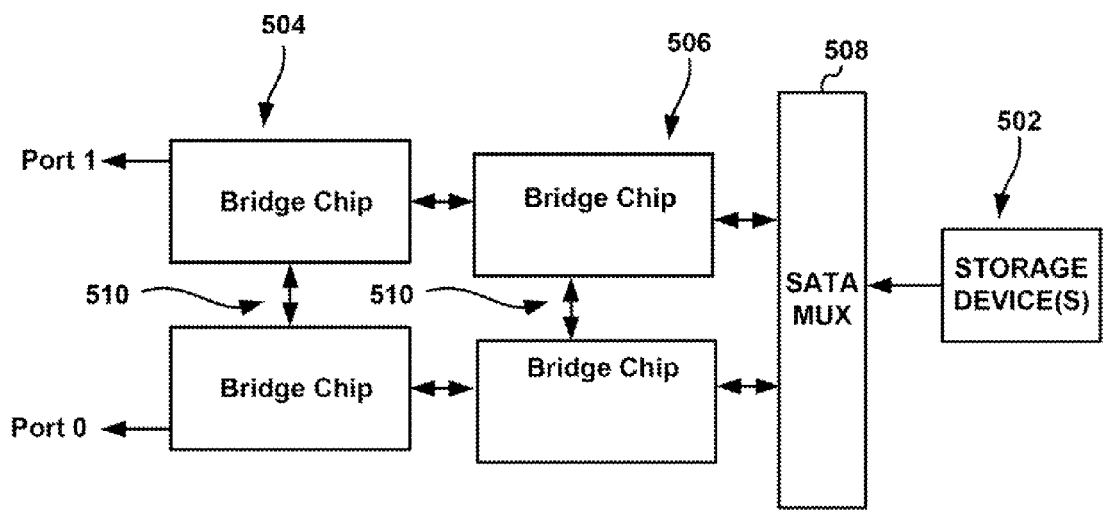

FIGS. 5A-5C show systems 500 for interfacing one or more storage devices with a plurality of bridge chips, in accordance with various embodiments. As an option, the present systems 500 may be implemented in the context of the functionality and architecture of FIGS. 1-4. Of course, however, the systems 500 may be implemented in any desired environment. Further, the aforementioned definitions may apply during the present description.

As shown in FIGS. 5A-5C, a plurality of storage devices 502 are provided. Further, a plurality of bridge chips 504 dedicated to interfacing with devices coupled to the storage devices 502 (e.g. device ports, etc.) are provided. Additionally, one or more bridge chips 506 may be utilized as a multiplexing device.

If the resources are maxed out on one of the bridge chips 504, data may be distributed across the multiple bridge chips 506, where at least one of the bridge chips 506 include multiplexer type functionality. As shown in FIG. 5C, a multiplexer 508 may be utilized, and additionally functions may be spread across the multiple bridges 506. It should be noted that any of the bridge chips 504 and 506 may be linked to any other bridge chip using one or more communication links 510.

Figure 6:
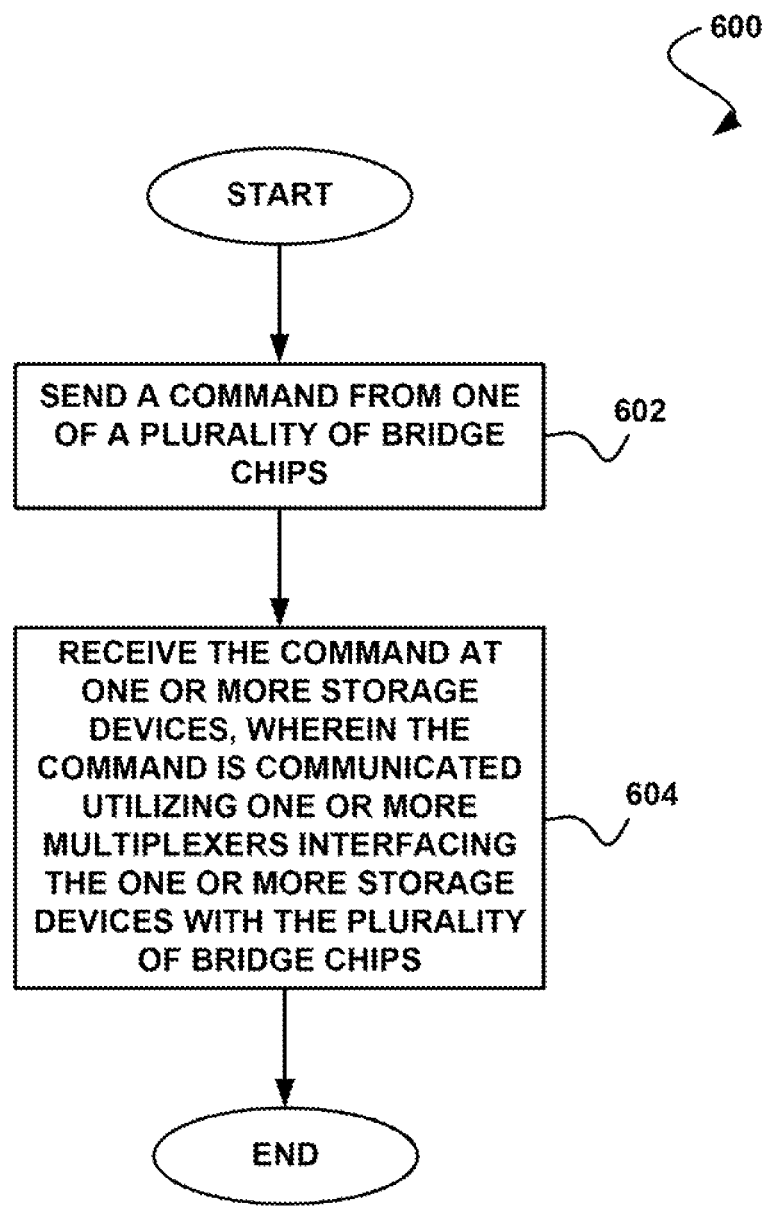
FIG. 6 shows a method for interfacing one or more storage devices with a plurality of bridge chips, in accordance with one embodiment.

FIG. 6 shows a method 600 for interfacing one or more storage devices with a plurality of bridge chips, in accordance with one embodiment. As an option, the present method 600 may be implemented in the context of the functionality and architecture of FIGS. 1-5. Of course, however, the method 600 may be carried out in any desired environment. Once again, the aforementioned definitions may apply during the present description.

As shown, a command is sent from one of a plurality of bridge chips. See operation 602. The command may include any command capable of being sent from a bridge chip. For example, in various embodiments, the command may include a read command, a write command, a FORMAT command, and/or any other command.

In one embodiment, the command may be a command that was translated from a first protocol to a second protocol. In this case, the bridge chip may have translated the command. Further, sending the command from the bridge chip may include relaying a command using the bridge chip. This relaying may include translating the command.

The command is then received at one or more storage devices. See operation 604. In this case, the command is communicated utilizing one or more multiplexing devices interfacing the one or more storage devices with the plurality of bridge chips.

Thus, in one embodiment, the command may be received by one of the bridges in a first format associated with a first protocol. The bridge may then translate the command to a second format associated with a second protocol.

The bridge may then send the command to the storage device. A multiplexing device may then receive the command sent by the bridge to the storage device and route the command signal to the storage device. In this case, the multiplexing device may be directly coupled to the storage device and the bridge chips (e.g. using a bus, etc.). The multiplexing device may also be indirectly coupled to the storage device and the bridge chips (e.g. through an intermediate device, etc.).

In another embodiment, a command or data may be received by one of the bridges in a first format associated with a first protocol (e.g. a SATA protocol, etc.). In this case, the storage device may have sent the command or data. The bridge may then translate the command or data to a second format associated with a second protocol (e.g. an SAS protocol, etc.).

The bridge may then send the command to another device coupled to, or in communication with, the bridge. A multiplexing device may then receive the command or data sent by the storage device to the bridge and route the command signal to the appropriate bridge.

Figure 7:
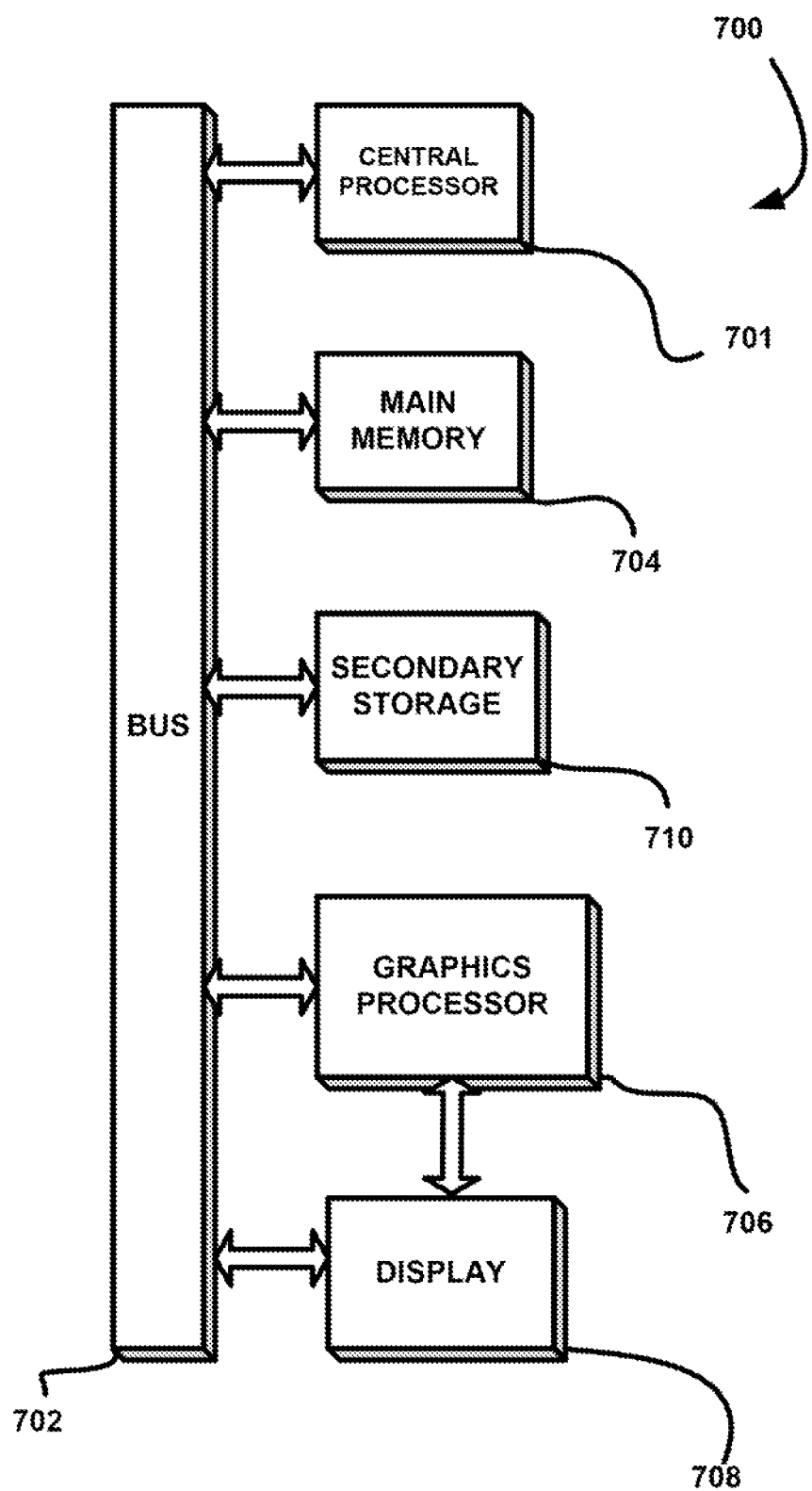
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to, a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a plurality of bridge chips collectively at least in part enabling interoperation between a storage device compatible with a first storage protocol and a central processor compatible with a second storage protocol, each of the plurality of bridge chips comprising respective resources comprising one or more protocol translation functions, at least one of the plurality of bridge chips configured to multiplex storage traffic and comprises a plurality of ports organized as a plurality of groups comprising a first port group, a second port group, and a third port group, the first port group being a mass-storage-side port group, the second port group and the third port group being mass-storage-utilizing-side port groups; and
a plurality of communication links enabling each of the plurality of bridge chips to communicate with each other;
wherein performance of a first protocol translation between the storage device and the central processor via a first storage port is at least based upon the resources of a first bridge chip of the plurality of bridge chips, the first bridge chip further comprising the first storage port;

wherein performance of a second protocol translation between the storage device and the central processor via a second storage port is at least based upon the resources of a second bridge chip of the plurality of bridge chips, the second bridge chip further comprising the second storage port;

wherein responsive to a condition in which all resources of a particular one of the plurality of bridge chips are in use, data is distributed across other bridge chips in the plurality of bridge chips;

wherein the at least one of the plurality of bridge chips configured to multiplex storage traffic is enabled to be configured in a first configuration such that information from the storage device presented to the first port group is sent to a selected one of the second port group and the third port group and is further enabled to be configured in a second configuration such that information from the storage device presented to the first port group is sent to the second port group and the third port group;

wherein one of the plurality of bridge chips is connected to one of the plurality of groups of the plurality of ports.

2. The apparatus of claim 1, wherein the storage device comprises one or more storage devices, and the first storage protocol is a Serial Advanced Technology Attachment (SATA) storage protocol.

3. The apparatus of claim 1, wherein each of the plurality of bridge chips are capable of performing at least part of the first protocol translation and the second protocol translation.

4. The apparatus of claim 1, wherein each of the plurality of bridge chips is at least sometimes active at the same time to collectively process storage traffic associated with a selected one of the first storage port and second storage port, and the second storage protocol is a Serial Attached SCSI (SAS) protocol.

5. The apparatus of claim 1, further comprising an interconnect coupling the plurality of bridge chips with the storage device, wherein the interconnect comprises at least one communication link of the plurality of communication links between one or more of the plurality of bridge chips.

6. The apparatus of claim 5, wherein the at least one communication link is configured such that each of the plurality of bridge chips are capable of communicating with each other of the plurality of bridge chips.

7. The apparatus of claim 6, wherein the at least one communication link is configured to be utilized for error recovery.

8. The apparatus of claim 6, wherein the at least one communication link is configured to be utilized for vendor unique communication.

9. The apparatus of claim 1, wherein at least one of the plurality of groups of ports of the at least one of the plurality of bridge chips configured to multiplex storage traffic comprises a plurality of input ports.

10. The apparatus of claim 9, wherein the plurality of input ports are connected to the storage device.

11. The apparatus of claim 1, wherein at least one of the plurality of groups of ports of the at least one of the plurality of bridge chips configured to multiplex storage traffic comprises a plurality of output ports.

12. The apparatus of claim 11, wherein the plurality of output ports are connected to at least one of the plurality of bridge chips.

13. The apparatus of claim 12, wherein a number of the plurality of output ports are divided equally and allocated to each of the plurality of bridge chips.

14. A method, comprising:
providing interoperation between a storage device compatible with a first storage protocol and a central processor compatible with a second storage protocol;
at least partially implementing storage traffic between the storage device and the central processor via a first storage port using protocol translation resources of a first bridge chip of a plurality of bridge chips, the first bridge chip comprises a plurality of ports organized as a plurality of groups comprising a first port group, a second port group, and a third port group, the first port group being a mass-storage-side port group, the second port group and the third port group being mass-storage-utilizing-side port groups, the first bridge chip further comprising the first storage port;
multiplexing, by the first bridge chip, the storage traffic to at least one of the plurality of bridge chips using protocol translation resources of at least one of the plurality of bridge chips, at least one of the plurality of bridge chips each further comprising a storage port;
communicating between the first bridge chip and at least one of the plurality of bridge chips via a plurality of communication links; and
distributing data across the plurality of bridge chips, at least in part via the plurality of communication links enabling each of the bridge chips to communicate with each other, wherein, responsive to a condition in which all resources of a particular one of the plurality of bridge chips are in use, the data is distributed across other bridge chips in the plurality of bridge chips;
wherein the first bridge chip is enabled to be configured in a first configuration such that information from the storage device presented to the first port group is sent to a selected one of the second port group and the third port group and is further enabled to be configured in a second configuration such that information from the storage device presented to the first port group is sent to the second port group and the third port group;
wherein one of the plurality of bridge chips is connected to one of the plurality of groups of the plurality of ports.

15. The method of claim 14, wherein performance of the multiplexing of the storage traffic is based upon a combination of the protocol translation resources of the plurality of bridge chips.

16. The apparatus of claim 1, wherein the storage traffic is a first storage traffic, wherein a performance of a selected one of a multiplexing of the first storage traffic and a multiplexing of a second storage traffic is based upon a combination of protocol translation resources of the plurality of bridge chips.

17. A system comprising:
a storage device;
a first bridge chip and a second bridge chip connected to a multiplexing bridge chip, the first bridge chip and the second bridge chip configured to perform protocol translation functionality and to distribute data, the multiplexing bridge chip configured to multiplex data, to perform protocol translation functionality, and to distribute data, the multiplexing bridge chip comprising a plurality of ports organized as a plurality of groups comprising a first port group, a second port group, and a third port group, the first port group being a mass-storage-side port group, the second port group and the third port group being mass-storage-utilizing-side port groups;
a first output port associated with the first bridge chip;

a second output port associated with the second bridge chip; and a communication link connecting the storage device to the multiplexing bridge chip;

wherein the multiplexing bridge chip is enabled to be configured in a first configuration such that information from the storage device presented to the first port group is sent to a selected one of the second port group and the third port group and is further enabled to be configured in a second configuration such that information from the storage device presented to the first port group is sent to the second port group and the third port group;

wherein one of the plurality of bridge chips is connected to one of the plurality of groups of the plurality of ports.

18. The system of claim 17, wherein the first bridge chip and the second bridge chip are connected by a second communication link.

19. The system of claim 18, wherein the multiplexing bridge chip is a first multiplexing bridge chip, the first multiplexing bridge chip is connected to a second multiplexing bridge chip by a third communication link, the second multiplexing bridge chip is configured to multiplex data and to perform protocol translations, the first and second multiplexing bridge chip are connected to a multiplexer to perform additional multiplexing functionality.

* * * * *